INVENTORS
HEINZ OELZE
FRANZ HARTLEIB
ATTORNEYS

United States Patent Office 3,102,182
Patented Aug. 27, 1963

3,102,182
HEAT-CONTACT PLASTIC WELDING DEVICE
Heinz Oelze and Franz Hartleib, Wiesbaden-Biebrich, Germany, assignors to Farbwerke Hoechst Aktiengesellschaft vormals Meister Lucius & Brüning, Frankfurt am Main, Germany, a corporation of Germany
Filed Apr. 4, 1961, Ser. No. 100,688
Claims priority, application Germany Apr. 8, 1960
3 Claims. (Cl. 219—19)

The present invention is concerned with an apparatus for sealing synthetic sheet material and the like by thermal contact welding.

Sheets of thermoplastic materials, for example, of polyvinyl chloride, polyethylene or polypropylene, can be welded together by thermal contact welding, thermal impulse welding or high frequency welding.

The high frequency welding process can only be applied for the heat-sealing of synthetic plastics having a definite loss angle, for example, for rigid sheets of polyvinyl chloride and for polyamide sheets, but not for sheets of polyolefins. Moreover, the high frequency generators required for this purpose are expensive and difficult to regulate. In the thermal impulse welding process the welding element which is, for example, a strip of nickel constantan is brought by means of a short current impulse to the temperature required for the welding operation. As soon as the impulse is interrupted the temperature of the strip decreases again. Such a behaviour would be favorable for the desirable cooling under pressure but unfortunately electrodes operating on the principle of thermal impulse are not yet available which operate in a reliable manner. The above-mentioned strips are extraordinarily sensitive, and after having been in use for a short time they heat up considerably so that the thermal impulse welding operation then has the character of a heat-contact welding operation. In the heat-contact welding process the welding elements are continuously heated and the temperature of the jaws has to be regulated by means of a thermostat. If is very difficult to keep the temperature of the jaws constant for a prolonged period although this is of decisive importance because of the relatively narrow temperature range which is available for thermoplastic treatment. If cooling is not brought about under pressure the sheet material shrinks after the thermal contact piston has been released, which is due to the reversible properties, for example, of polyvinyl chloride, and an unattractive welded seam forms. When the welding jaws are opened the welded sheets often stick to them. Covering layers, the use of which has been proposed in order to overcome this drawback and which are made, for example, of tetrafluorethylene, are heated to a high temperature, too, after a short time and in this case, too, the welded seams have a tendency to become wavy.

There is consequently a pressing need for a heat-contact welding apparatus which operates in an unobjectionable and reliable manner and it is the object of the present invention to provide such an apparatus.

The heat-contact welding apparatus according to the invention comprises a welding element having the form of a thin sheet (membrane) made of a material of good thermal conductivity such, for example, as copper. The welding element takes the heat which is necessary for the welding operation from a heat source of appropriate dimensions and transfers it to the sheet material or the like to be welded. The apparatus also comprises a water-cooled pressing element and a control device both for the welding element and the pressing element. The control device first effects a lowering of the welding element onto the sheets to be welded, then lowers the cooled pressing element onto the upper surface of the welding element and lifts off the pressing element and then the welding element.

Depending on the thickness of the sheet material the membrane serving as welding element may be relatively thin, for example, of copper 0.1 to 0.4 mm. thick, for it merely serves to take up the heat from the heat source and to convey it to the sheet. When a material having the aforesaid thickness is used such a heat transfer takes place within seconds or a fraction of a second. The cooled pressing element which subsequently descends to the upper surface of the thermal impulse membrane immediately takes the heat from the welded seam and at the same time it presses the welding element into the synthetic material, so that the welded seam is cooled under pressure and consequently retains its shape.

The welding element may have any form which is chosen for the welded seam. It may, for example, be linear, geometrically regular or quite irregular. It may be conveniently heated by heating elements mounted on a carrier or by a device imparting current impulse to the required temperature, which may be within the range of about 150° to 250° C. depending on the kind of sheet material. A greater static stability may advantageously be imparted to the welding element by cold pressing it, for example, from a round copper disk.

An apparatus embodying the invention is shown diagrammatically by way of example in the accompanying drawings, the apparatus shown being designed particularly for welding a flanged lid of synthetic material on the bent rim of a deep-drawn container of synthetic material which may be used, for example, for the packing of fish marinades, jam and other food-stuffs.

Figure 1:
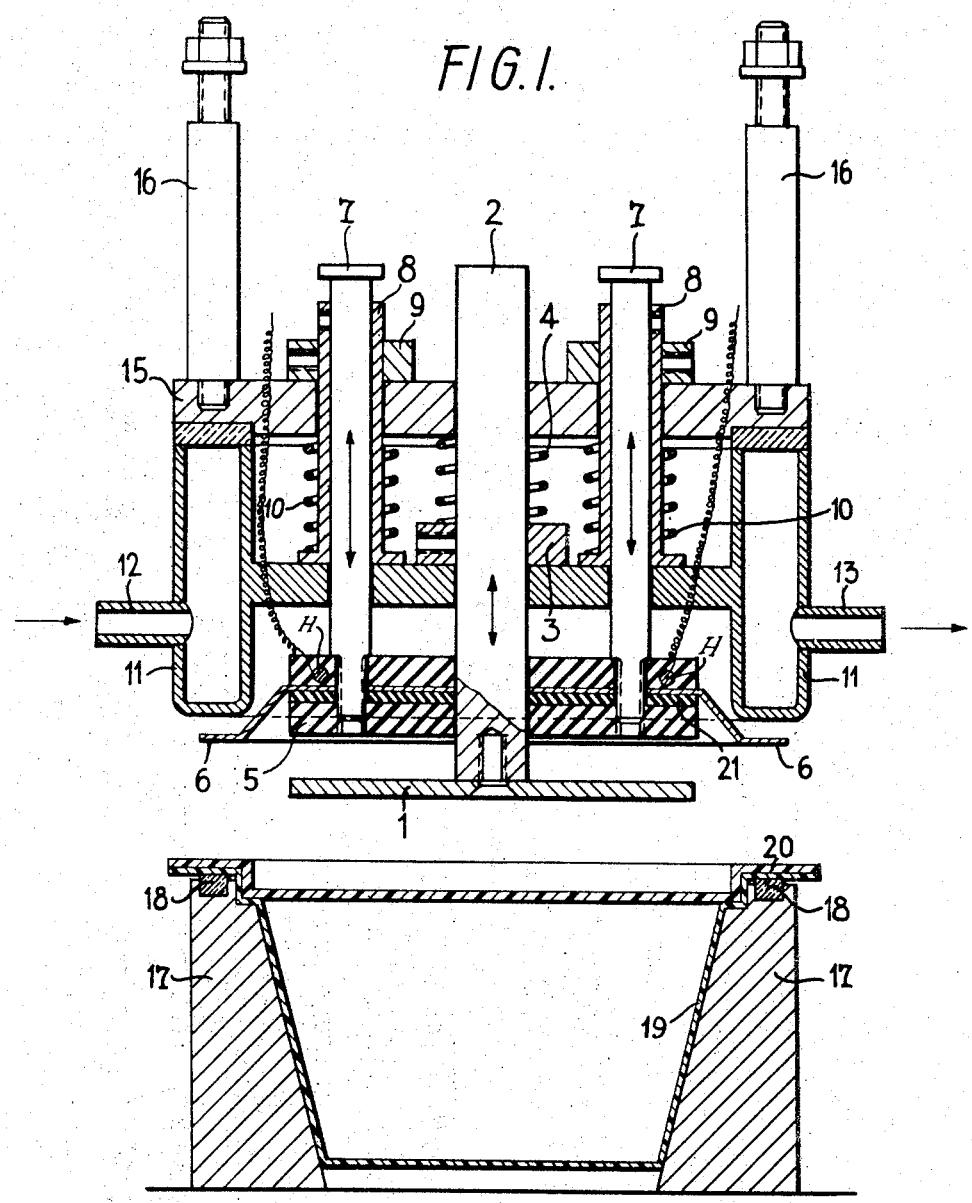
FIG. 1 is a section of the upper part and the lower part of the apparatus before the welding operation.

The lower part of the apparatus consists substantially only of a hollow mold 17 which is to receive the deep-drawn container 19 of synthetic material which is to be closed, and of an annular heat-insulating base 18 of inelastic or elastic material, for example, silicone rubber, which extends over the upper horizontal surface of the lower part of the apparatus within the region of the welding zone. The container of synthetic material is covered in this part of the apparatus with a lid 20 of synthetic material which is to be welded onto the container and which is bent at its inside at right angles in a downward direction.

The following elements are arranged concentrically in the upper part of the apparatus. Guide piston 2 having holding device 1 secured to one end, is arranged for limited downwardly biased sliding movement with respect to cover plate 15, pressing and cooling member 11, and clamping plate 5 by means of ring 3 and compression spring 4. Clamping plate 5 is adjustably supported from cover plate 15 by bolts 17 secured within guide and setting boxes 8 having adjusting rings 9 arranged at one end. The bolts 7 and attached guide and setting boxes are slideably received for limited linear reciprocal movement through cover plate 15 and pressing and cooling member 11. Both piston 2 and bolts 7 are spring biased toward the object being welded by springs 4 and 10. Clamping plate 5, in turn, acts as a mount for a thin heat-conductive membrane or welding element 6 and also retains suitable annular electrical heating elements H arranged in heat distributing contact with welding element 6. Pressing and cooling member 11 is secured to cover plate 15 having an annular hollow shape and provided with inlet and outlet lines 12, 13 for circulation of a liquid coolant such as water. By means of adjusting rings 9 the inside vertical distance between the lower surface of the pressing and cooling member 11 and the upper surface of the welding element 6 can be varied. By said distance and the time which it takes cover plate 15 and the attached pressing and cooling member to move from its uppermost position until it touches the welding element 6 the time of welding is determined. At 4 is illustrated a counterpressure spring for the holding down device 1. Compression springs 10 provide the pressure for the clamping plate 5 and attached welding element 6 when cover plate 15 is lowered. The numeral 16 represents bolts which serve to adjust the location of the welding device in the usual welding press.

Within the clamping plate 5 is shown a mica insulator 21. A mica insulator is, however, not necessary when a current impulse is applied to the welding element 6.

Figure 2:
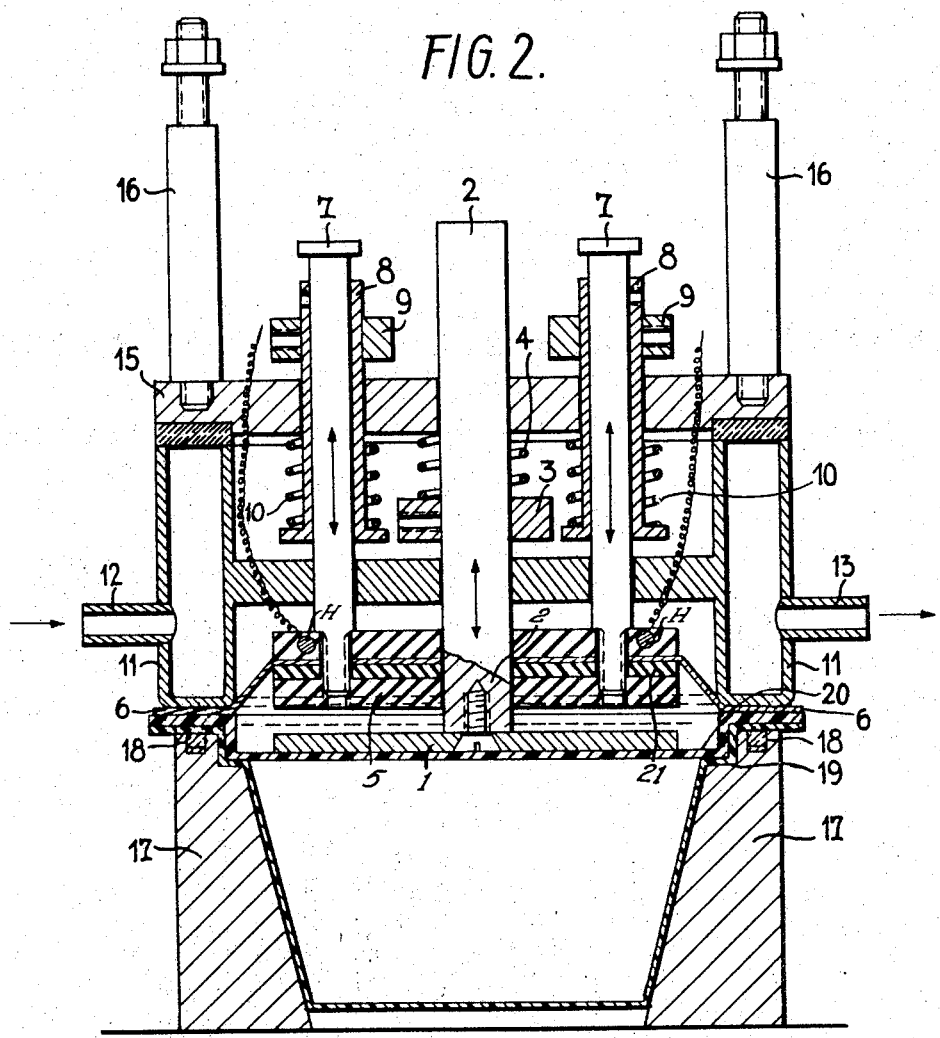
FIG. 2 is a section of the FIG. 1 assembly shown in sealing position.

FIG. 2 illustrates a section of the apparatus shown in FIG. 1 in which the transfer of the thermal impulse to the welding element 6 has taken place and the pressing and cooling element 11, which now is in its lower position, presses the welding element 6 against the welded seam and simultaneously cools it so that the welded seam is cooled under pressure and consequently retains its shape.

In the drawings, the relative movability of the individual parts which are engaged or not engaged is indicated by double arrows. When the container top is in position the holding down device 1 touches the lid 20 of synthetic material. By the further relative movement of the guide piston 2 in a vertical direction the welding element 6 is placed on the rim of the lid of the container to be welded and heat is transferred to the welding element from heating elements mounted in clamping plate 5. In the next phase of the movement the pressing and cooling element 11 is pressed down onto welding element 6 by a further lowering of the cover plate 15, which thereby exerts a mechanical pressure on the heated region of the rim of the lid and on the flange of the container whereby sealing is brought about. The thin welding element 6 and the area of the welded seam are thereby cooled.

After a sufficient duration of the cooling and welding operations which depends on the kind and the thickness of the layers of synthetic material to be welded, first the pressing and cooling element 11, then the welding element 6 and finally the holding down device 1 are lifted off vertically so that the sealed container is set free and can be removed from the lower part 17 of the apparatus.

As soon as the pressing and cooling element 11 is again lifted off from the thin welding element 6 the latter can be heated up again within a few seconds.

The temperature of the welding element 6 can, of course, also be regulated by a quickly reacting thermostat.

If the clamping plate 5 is made of an insulating material the welding element 6 which in this case has to be made of a material of corresponding electrical conductivity may be heated by current impulse by means of an impulse regulator, the current impulse being conferred to it when the apparatus is in the opened position.

Whereas the mode of construction of the apparatus described above is designed for the welding of lids onto containers of synthetic material and is, therefore, provided with an annular sealing element and a pressing and cooling element having a corresponding annular form, the apparatus may operate according to the same principle but employ welding and pressing elements having different shapes; in particular it may be inserted in machines for filling and sealing bags of synthetic plastics and interconnected separate packages, in which case it is desired that the welding jaws be continuously heated; it has hitherto not been possible to operate continuously in a satisfactory and economical manner. As apparatus of this kind there may be mentioned by way of example devices for welding foils of cellulose hydrate which have been made weatherproof by hydrophobic coatings or foils of cellophane coated with polymers. For the aforesaid purpose thin, conductive welding elements are suitably arranged before the cooling element 11.

We claim:

1. A heat-contact welding apparatus for welding layers of thermoplastic materials comprising, in combination, mounting means, pressing and cooling means secured to said mounting means, a piston slidably received through said mounting means and said pressing and cooling means, said piston being adapted for limited linear reciprocal movement and biased in a downward direction, a holding element secured to one end of said piston, adjustable supporting means transversely arranged and slidably received with respect to said mounting means and said pressing and cooling means, said supporting means being adapted for limited linear movement and biased in a downward direction, a heat-conductive welding element secured to one end of said adjustable supporting means, heating means in contact with said heat-conductive welding element, and a heat insulating base receivably arranged with respect to said heat-conductive welding element.

2. A device according to claim 1 in which said piston and said adjustable supporting means are spring biased away from said mounting means, said pressing and cooling means is a hollow liquid cooled heat-conductive element arranged transversely with respect to said piston, said heating means is an electric resistor element in contact with said heat-conductive welding element and said heat insulating base is a mold having a heat insulating ring mounted in its lip.

3. A device according to claim 1 in which said heat-conductive welding element comprises a thin sheet of heat-conductive material transversely arranged with respect to said piston, and said adjustable supporting means comprises a plurality of bolts equipped at one end with adjusting rings supported on said mounting plate and secured to said heat-conductive welding element at the end removed from said adjusting rings.

References Cited in the file of this patent
UNITED STATES PATENTS

| | | |
|---|---|---|
| 2,638,964 | Andina | May 19, 1953 |
| 2,714,416 | Fener | Aug. 2, 1955 |
| 2,951,141 | Bernhardt | Aug. 30, 1960 |